H. B. WING.
HAY PRESS.
APPLICATION FILED FEB. 16, 1914.

1,197,784.

Patented Sept. 12, 1916.
6 SHEETS—SHEET 4.

UNITED STATES PATENT OFFICE.

HARRY B. WING, OF GUNNISON, COLORADO.

HAY-PRESS.

1,197,784.      Specification of Letters Patent.      Patented Sept. 12, 1916.

Application filed February 16, 1914. Serial No. 818,972.

*To all whom it may concern:*

Be it known that I, HARRY B. WING, citizen of the United States, residing at Gunnison, in the county of Gunnison and State of Colorado, have invented new and useful Improvements in Hay-Presses, of which the following is a specification.

My present invention pertains to hay presses; and it contemplates the provision of an automatic hay press that is reliable in operation, possessed of high efficiency and is well adapted to withstand the rough usage to which hay presses are ordinarily subjected.

The invention in all of its details will be fully understood from the following description and claims when the same are read in connection with the drawings, accompanying and forming part of this specification, in which:

Fig. 3 is an enlarged detail plan of the mechanism for actuating the feeding fork. Fig. 3ª is a detail view illustrative of the manner in which the feeding-fork cable is passed around the drum on the transverse shaft. Figs. 10 and 11 are detail views of the dividing-fork comprised in the press. Figs. 13 and 14 are detail views of appurtenances of the feeding-fork hereinafter specifically referred to.

Similar letters and numerals of reference designate corresponding parts in all of the views of the drawings.

Figure 1:
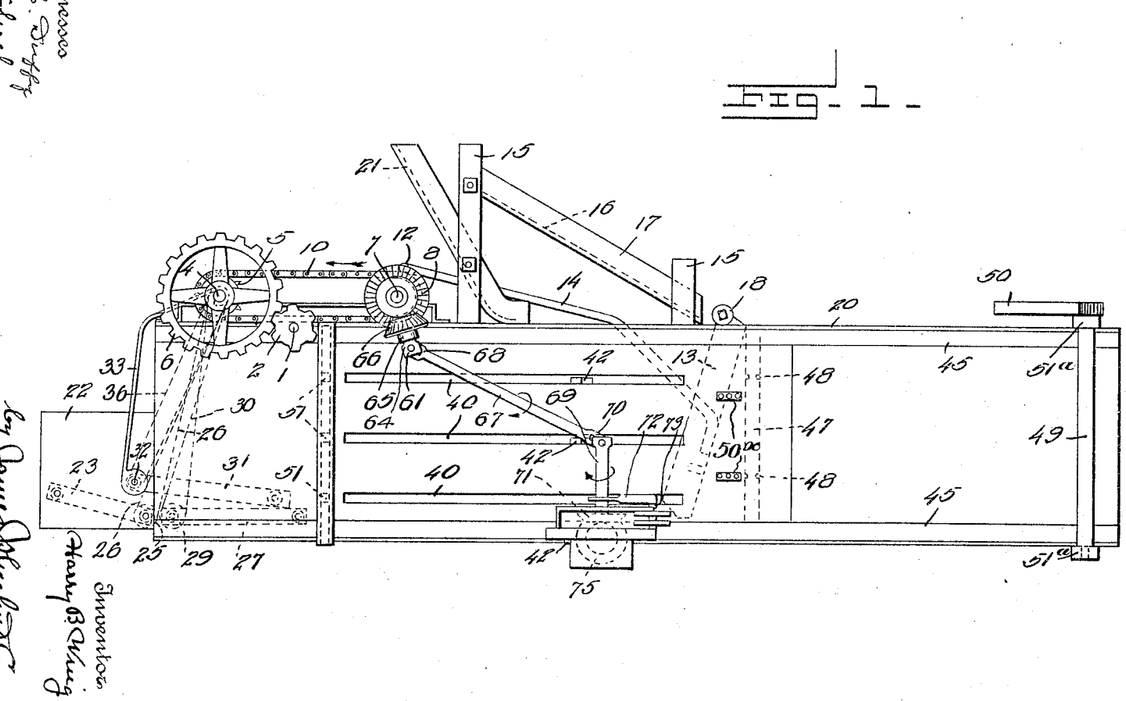
Figure 1 is a side elevation of the automatic press constituting the best practical embodiment of my invention that I have as yet devised.
Figures 1, 2:
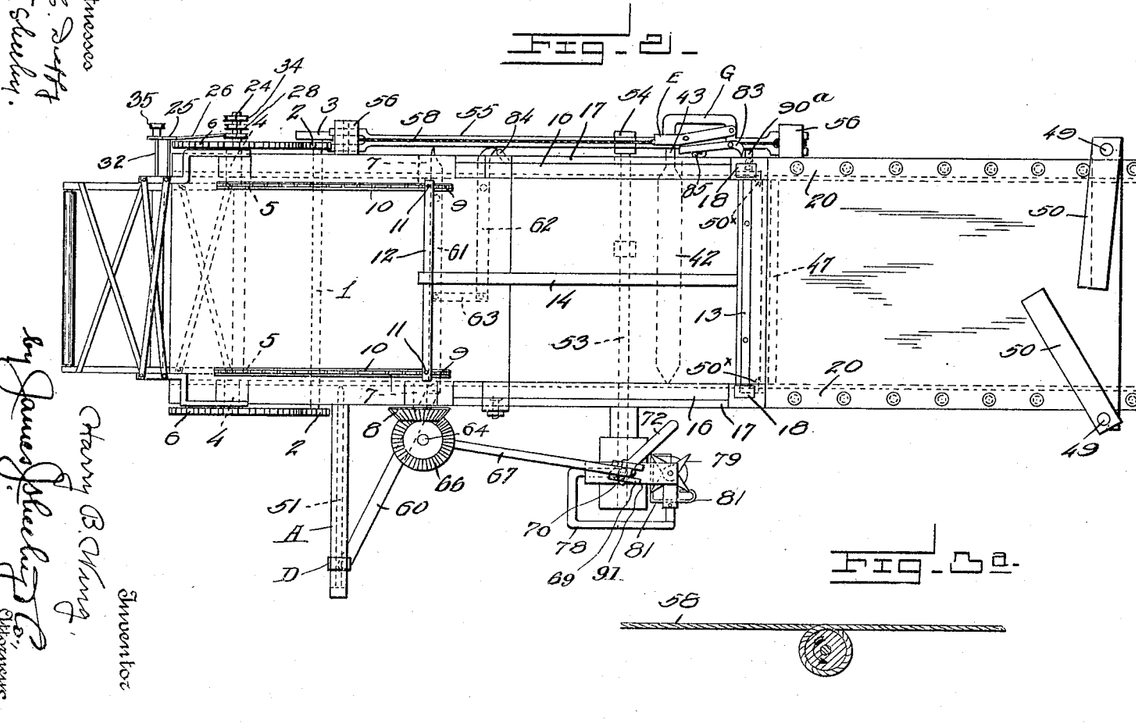
Fig. 2 is a top plan view of the machine.
Figure 4:
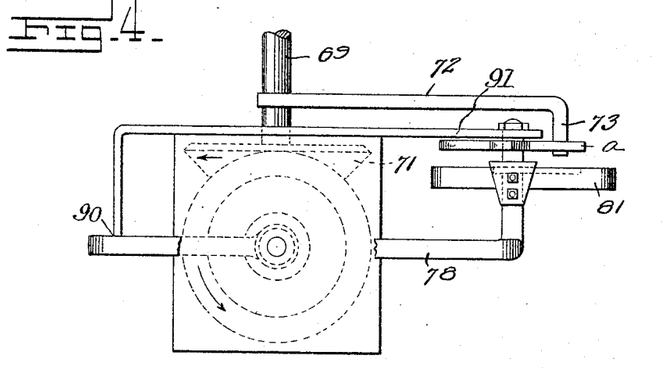
Fig. 4 is an enlarged detail side elevation of the feeding-fork driving mechanism.

Mounted on the rear portion of the main frame of my novel press is a transverse shaft 1, equipped with spur gears 2 and a band pulley 3, Fig. 2, the latter for connection with a suitable motor (not shown). Journaled on the main frame back of the shaft 1 are two short shafts 4, and on each of these is fixed a sprocket gear 5 and a spur gear 6, the spur gears being intermeshed with the spur gears 2 so as to be driven therefrom. At a slight distance in front of the shaft 1 are short transverse shafts 7. These shafts 7 are equipped with fast sprocket gears 9, Fig. 2, connected through sprocket belts 10 with the sprocket gears 5. The shaft 7 at the right-hand side of the machine is also equipped with a beveled gear 8 for a purpose hereinafter pointed out. Connected at 11 with the belts 10 and movable therewith lengthwise of the machine and around the sprocket gears is a cross-bar 12, and interposed between and connected to the said cross-bar 12 and a plunger-head 13 is a pitman 14 that is adapted to swing vertically on the cross-bar 12. Fixed to and rising from the sides of the main frame are front and rear uprights 15, and pivotally connected to and supported by the rear uprights 15 are inclined rails 16, having side guards 17. The said rails 16 are provided for the rearward traverse of traveling wheels 18 on the plunger-head 13, and they serve incidental to said traverse, to raise the plunger head in the opening at the top of the feeding chamber in the main frame. The said rails are adapted to swing vertically at the sides of the forward uprights 15. This provision is made in order to enable the wheels 18, on the forward traverse of the plunger-head 13, to move under and raise the forward ends of the rails 16 and assume the position shown in Figs. 1 and 2. The wheels 18 travel upwardly and rearwardly on the rails 16 during the rearward traverse of the cross-bar 12 around the forward sprocket gears and rearwardly with the upper stretches of the belts 10. When the wheels 18 move off the upper ends of the rails 16, the plunger-head 13 and the said wheels 18 gravitate, and the latter engage and move downwardly on the rear inclined rails 21. From the lower and forward ends of the rails 21, the wheels 18 pass to horizontal rails 20, fixed on the main frame. At that time the plunger-head 13 is in its lowermost position, and while in said position it is moved forwardly by the cross-bar 12 which is then moving forwardly with the lower stretches of the sprocket belts 10 until the wheels 18 rise and pass the forward ends of the rails 16, when the operation described will be repeated.

The hay to be pressed is manually thrown in a box 22 and on an endless conveyer 23 that is driven from the left-hand shaft 4 through the medium of a pulley 24 thereon, a pulley 25 on the forward shaft of the conveyer 23 and a crossed belt 26 connecting said pulleys. Arranged in advance of the conveyer 23 and in the main frame adjacent the bottom thereof is an endless apron 27. This apron is driven from the said left-hand shaft 4 through a pulley 28 thereon, a pulley 29 on the rear shaft of the endless apron, and a crossed belt 30 that connects the said pulleys 28 and 29. Above the meeting portions of the conveyer 23 and apron 27 is a vertically-swinging apron 31. The rear shaft 32 of this apron is journaled in hangers 33, and said apron is driven from the left-hand shaft 4 through the medium of a pulley 34 on said shaft 4, a pulley 35 on shaft 32, and a belt 36 that connects the pulleys 34 and 35.

The conveyer 23 carries the hay to the lower apron 27. The apron 27 causes the hay to move forwardly past the dividing fork, hereinafter described. In this the apron 27 is assisted by the vertically-swinging apron 31, the latter being heavy enough to keep the hay from backing up. The hangers 33 support the rear portion of the apron 31 so as to permit the hay to pass forwardly between the opposed stretches of the two aprons 27 and 31. The forward portion of said apron 31, however, bears downwardly on the hay, and in that way contributes to the positiveness of the forward feed of the hay.

The side walls of the feeding chamber in the main frame are provided with longitudinal slots 40 to permit of the movement of and guide the vertical series of transverse feeding-fork tangs 42 that are fixed to and movable with a head 43.

At 45 the press is provided with a tying chamber where wires are placed on the hay with the assistance of head blocks, one of which, 47 is shown in Figs. 1 and 2, and which block 47 is provided with grooves 48, Fig. 1, on each side.

49, 49 are tension side rods complementary to the tying chamber 45, and 50, 50 are tension levers that coöperate with the rods 49 and cross-bars 51ª to contract the discharge end of the chamber 45 and bring about compression of the hay in the chamber. In the practical operation of this portion of the press, the two head blocks are placed so as to form a bale about four feet long; the wires being manually passed through the grooves of the blocks and around the hay from the front head block to the rear head block, and the blocks serving in conventional manner to separate the bales.

50ˣ 50ˣ are beveled dogs carried by the main frame and adapted to spring outwardly under forward pressure of the head blocks, and then resume the position shown in Fig. 2 back of the head blocks so as to prevent retrograde movement thereof.

Figure 10:
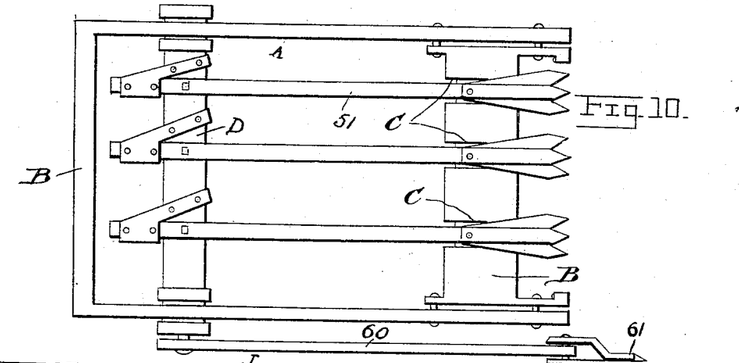

51, 51, Figs. 1, 2 and 10, are the tangs of a dividing fork which are movable transversely as a unit into and out of the main frame of the press.

52, Figs. 3, 9, 12, 13, 14 and 15, is a feeding-fork conveyer movable to and fro longitudinally at the left-hand side of the machine.

53 is a transverse shaft journaled in the main frame and equipped adjacent the left-hand side thereof with a drum 54.

55 is a longitudinally-disposed bar fixedly connected at the points 56 to the main frame and having bifurcated ends.

57, 57 are vertical sheaves mounted in the bifurcated ends of the bar 55.

58 is a cable connected at the points 59 to the conveyer 52 and passed around the sheaves 57 and looped around the drum 54, as shown in Fig. 3ª.

60 is a dividing-fork lever.

Figure 9:
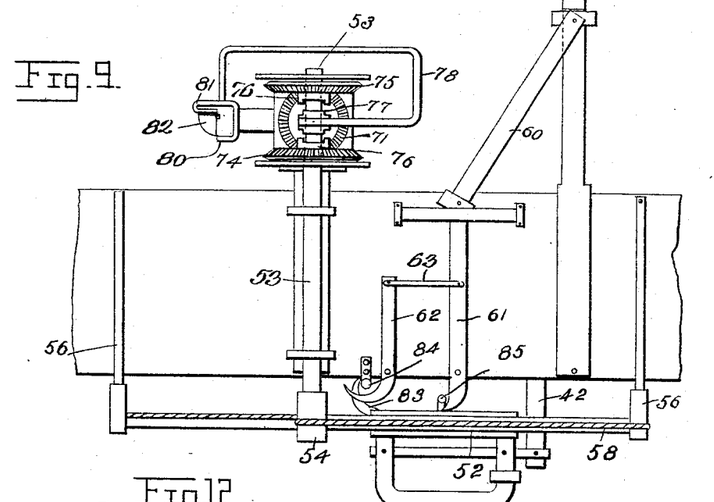
Fig. 9 is an inverted plan view of part of the press.

61 and 62 are dividing-fork trips; the trip 62 being arranged in advance of the trip 61, and the two being connected by a link 63, Fig. 9.

64, Figs. 1 and 2, is a shaft supported in a bearing 65 at the right-hand side of the machine and having a beveled gear 66, intermeshed with the before-mentioned beveled gear 8.

67 is an oblique shaft connected through a knuckle joint 68 with the shaft 64.

69 is a vertical shaft connected through a buckle joint 70 with the oblique shaft 67 and provided with a beveled gear 71, and also with a swinging arm 72 on which is a depending finger 73.

74 and 75 are beveled gears loosely mounted on the shaft 53 and intermeshed with the gear 71 and having at their inner sides clutch-members 76.

77 is a clutch that is mounted on the shaft 53 so as to turn therewith and slide thereon.

78 is a trip lever, connected to the clutch 77 and pivoted at 90 to the fixed frame 91.

79 is a rotatable wheel connected with the frame 91 and having four spokes.

82 is a rotatable sector-shaped device fixed with respect to and movable with the wheel 79.

80 is a frame connected to and movable with the trip lever 78 and having a U-shaped portion 81 opposed to the sector-shaped device 82.

Figures 5, 6, 7, 8:
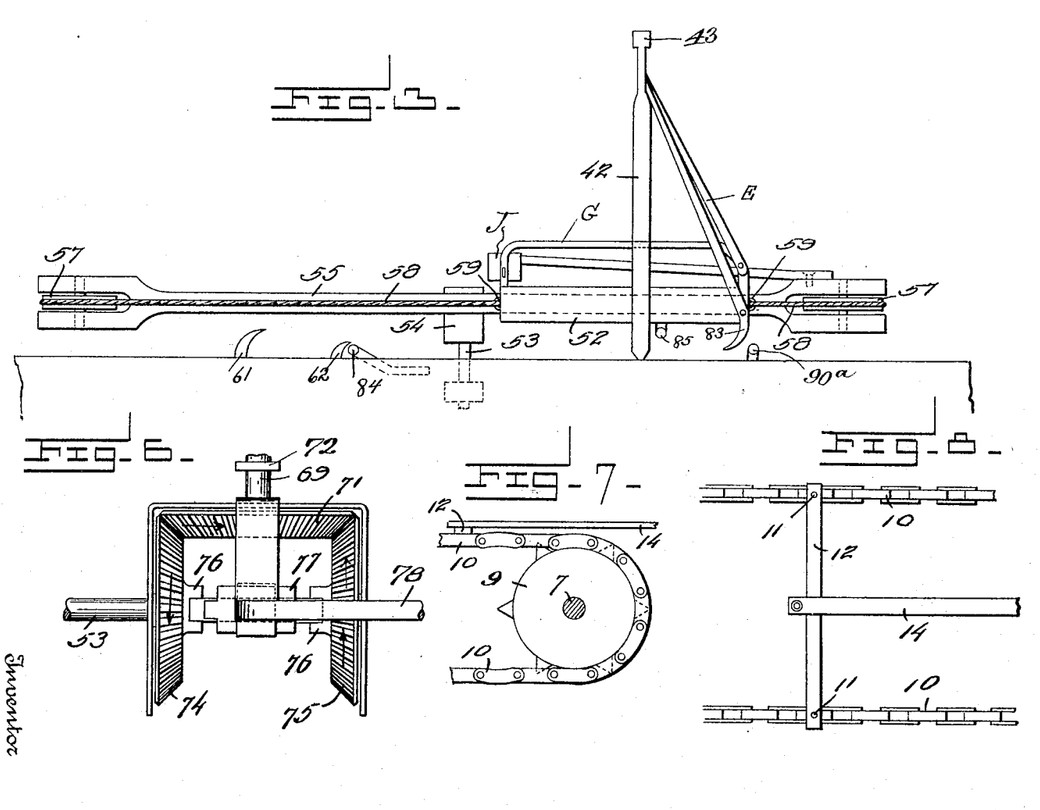
Fig. 5 is a top plan of the same.
Fig. 6 is a detail view of the clutch mechanism taken at a right angle to Fig. 4.
Figs. 7 and 8 are detail views of the means for actuating the plunger head.
Figure 5:
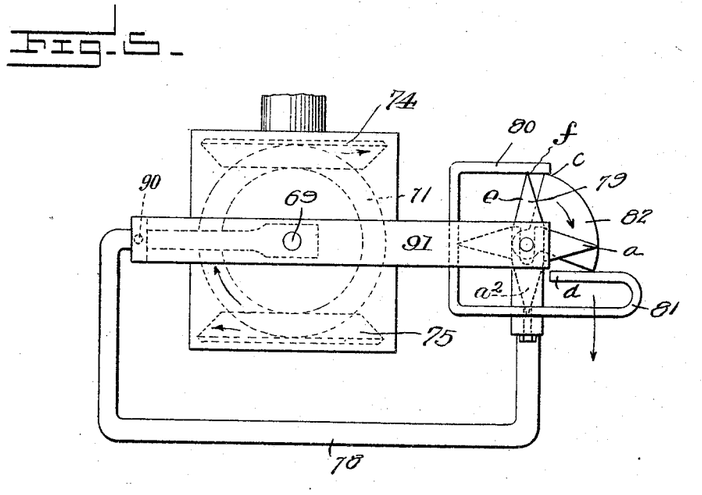
Figures 12, 15:
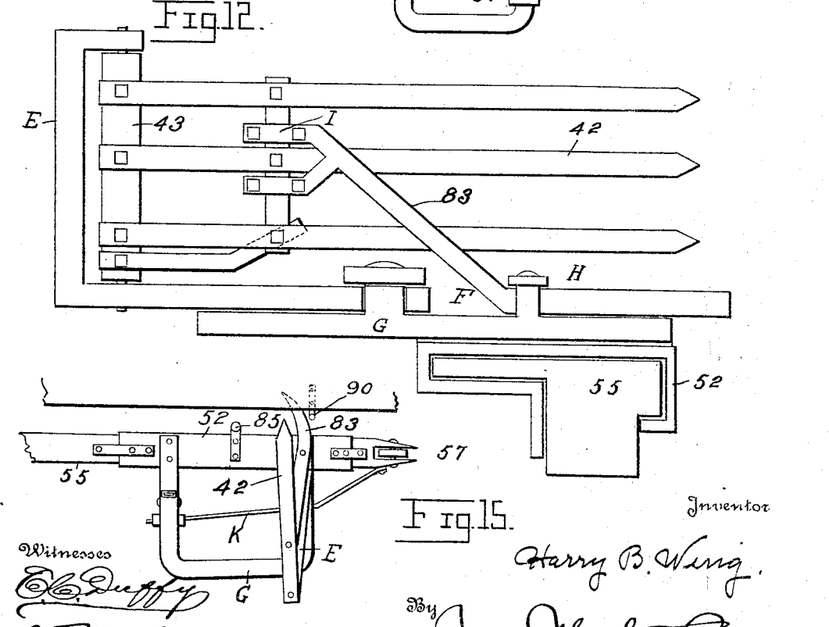
Fig. 12 is a detail view of the feeding-fork comprised in the press.
Fig. 15 is a detail plan illustrative of the feeding-fork and the parts that coöperate therewith.
Figure 13:
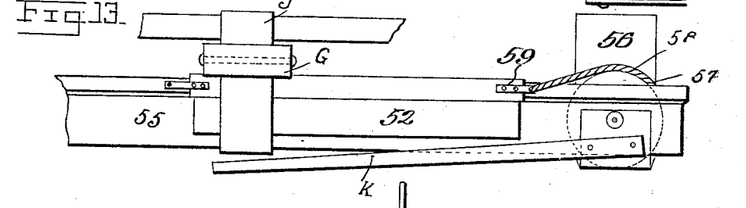

83, Fig. 12, is a trigger on the conveyer 52 to strike a trip 84 on the main frame, and 85, Figs. 2 and 9, is a trip on the conveyer 52 to strike the dividing fork trip 61. Incidental to four revolutions of the shaft 67 the shaft 69 and the arm 72 are turned through four revolutions. On each revolution of the arm 72 the wheel 79 and the sector-shaped device 82 are turned through a quarter of a revolution, the depending portion 73 of the arm 72 acting against one of the spokes of the wheel 79, and said wheel 79, and the device 82 being movable together, as before described. The arm 72 striking the wheel 79 twice moves the sector-shaped device 82 into engagement with the portion 81 of frame 80, and on the next movement of said device 82 it moves the frame 80 in the direction of the arrow in Fig. 5, and thereby rocks the lever 78 on the pivot 90, and engages the clutch member 77 with the clutch member 76 on gear 75. On the subsequent rotation of the arm 72, the sector-shaped device 82 operates to move the frame 80 and the lever 78 in the opposite direction to that indicated by arrow in Fig. 5, and consequently the clutch member 77 is moved out of engagement with the member 76 on gear 75 and into engagement with the member 76 on the gear 74. When the clutch member 77 is engaged with the member 76 on gear 75, the shaft 53 will be turned through two revolutions and the feeding fork will be moved forwardly, while when the clutch member 77 is engaged with the member 76 on gear 74, the shaft 53 will be turned through two revolutions in the opposite direction and the feeding fork will be moved rearwardly.

In the operation of the press, the plunger head 13 moves up the rails 16 to the upper ends thereof, and at the same time the conveyer 52 moves toward the left until the trigger 83 strikes the trip 84 on the main frame, and trip 85 on the conveyer 52 strikes the trip 61, Figs. 2, 3 and 9. This throws both forks into the press at the same time. Both forks pass through the hay, and then the feeding fork 42 is moved forwardly toward the plunger head 13, until the trip 85 on the conveyer 52 strikes the dividing fork trip 62, whereupon the dividing fork will be thrown out of the press. When the wheels of the plunger-head 13 reach the upper ends of the rails 16, the feeding fork 42 passes under the plunger head 13 with hay and to the position shown by dotted lines in Fig. 2. The feeding fork continues toward the right to the forward ends of the slots 40, and at this time the trigger 83 on the conveyer 52 strikes the trip 90$^a$ on the main frame, Fig. 15, which forces the feeding fork out of the press as shown in Fig. 3. The plunger head 13 moves forwardly to the extremity of its stroke and shoves the head block 47 past the dogs 50$^x$. The pitman 14 then moves rearwardly with the upper stretches of the belts 10 and then downwardly and then forwardly, with the lower stretches of said belts. Four revolutions of the gears 6 accompany one stroke of the plunger head 13, and synchronously with the same the bevel gear 8 makes four revolutions and causes the shaft 67 and the bevel gear 71 to make four revolutions. The gear 71 turns continuously toward the right. The beveled gear 75 at the right of gear 71 turns toward the left, and the beveled gear 74 at the left of gear 71 turns toward the right. The oblique shaft 67 turns as indicated by arrow and swings the lever 72 toward the right, whereupon the finger 73 of said lever strikes the spoke $a$ of the wheel 79 and forces said spoke toward the right, thereby causing the sector 82 to move the U-shaped frame 81 and trip lever 78 as before described. This causes the shaft 53 and the drum 54 to revolve as indicated by arrow in Fig. 3$^a$, and through the cable 58 brings about the forward movement of the feeding fork. On the following rotation the finger 73 of the arm 72 strikes the spoke $a$ of wheel 79 and causes said spoke to move to the position indicated by $a^2$ in Fig. 5. This movement causes the sector-shaped device 82 to move until $c$ of sector-shaped device 82 reaches the point $d$ in the U-shaped frame 81. The beveled gear then makes another revolution and causes the lever 72 to move the spoke $e$ of the wheel 79 to the position of the spoke $a$. This causes the device 82 to strike the inner arm 80 of the U-shaped frame 81 at $f$ and throws the clutch 77 into the clutch-member 76 of gear 74, and causes the shaft 53 and drum 54 to turn toward the right or in the direction opposite to that indicated by arrow in Fig. 3$^a$. This causes the feeding fork 42 to move toward the left until the trip 85 strikes the trip 61. Trigger 83 at the same time strikes trip 84. Thus the feeding fork 42 and the dividing fork 51 are caused to enter the main frame of the press at the same time.

It will be noted from the foregoing that during two revolutions of the beveled gear 71 the feeding fork 42 will be moved toward the right, and during the succeeding two revolutions of said gear the feeding fork will be moved toward the left. It will also be noted that precedent to the rearward movement of the feeding fork 42, the said fork is retracted from the main frame of the press so as not to interfere with the forward movement of the plunger head 13, the forward movement of the fork 42 in the feeding chamber taking place while the wheels 18 of the plunger head 13 are making their traverses on the rails 16 and 21.

Figures 11, 14:
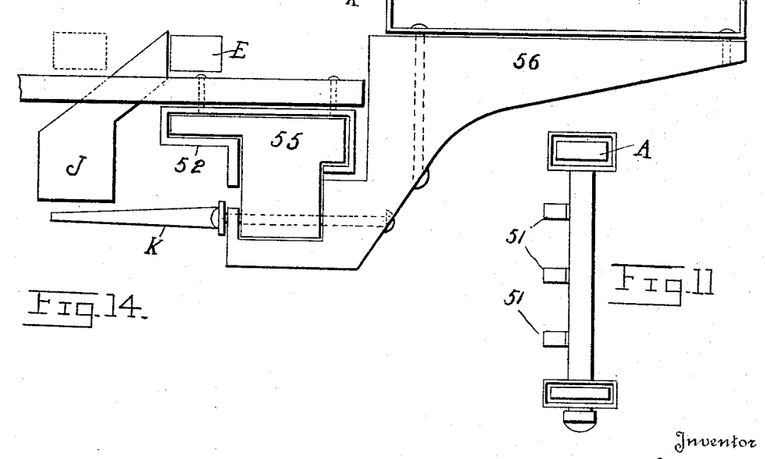

A in Figs. 2, 10 and 11 is a U-shaped frame that is fixed to and extends laterally outward from the main frame.

B, Fig. 10, is an upright bar extending between and fixed to the upper and lower bars of the frame A at a point adjacent the main frame, and having guideways C in one side for the dividing fork tangs 51, and D is an upright head mounted and slidable on the upper and lower bars of the frame A. The tangs 51 are connected at their outer ends to the said head D so as to move inwardly and outwardly therewith. The dividing-fork lever 60 is connected to the lower end of said head D, as clearly appears in Fig. 10.

As appears in Fig. 12, the tangs 42 of the feeding-fork are fixed to an upright head or rock shaft 43. The said rock-shaft is journaled in and carried by a horizontally-swinging frame E, pivoted at F on a platform G, fixed on the conveyer 52. Pivoted at H on the platform G, and pivotally connected at I to the several tangs 42 of the feeding fork, is the before-mentioned trigger 83.

When the frame E is swung inwardly to a position parallel to the main frame to put the tangs 42 in the press, it rides over and passes a keeper J, pivoted to the platform G. During the forward traverse of the feeding-fork, the said keeper J rides on a track K, that extends between and is connected to the platform G and the bar 55, with the result that the feeding-fork is retained in the press. When, however, the keeper J passes from the track K, the keeper J is free to swing so as not to interfere with the outward movement of the frame E necessary to the withdrawal of the feeding-fork from the press at the completion of the forward traverse of said fork. It will also be observed by reference to Figs. 13 and 14 that while the keeper J is above the track K, there is nothing to prevent the frame E from swinging inwardly to the position shown in Fig. 14, as when the feeding-fork is moved inwardly into the press. When the trip 85, strikes the trigger 61 the points of triggers 61 and 62 are thrown together and the trip 83 strikes the trip 84 and causes the feeding fork to enter the press.

Having described my invention, what I claim and desire to secure by Letters-Patent, is:

1. In a press, the combination of a frame containing a chamber, division means movable into and out of the frame, means for actuating said division means, feeding means movable into the frame forwardly in the frame and then out of the same, and rearwardly outside the frame, means for actuating said feeding means, a plunger head movable into the frame, forwardly in said frame and out of the frame and rearwardly outside the frame, and means for actuating said plunger head.

2. In a press, the combination of a frame containing a chamber, division means movable into and out of the frame and laterally relative thereto, means for actuating said division means, feeding means movable into the frame and also forwardly in the frame and then out of the frame and rearwardly outside the frame, means for actuating said feeding means, a plunger head movable into the frame and forwardly in the same and then out of the frame and rearwardly outside of the frame, in the order named, and means for actuating said plunger head.

3. In a press, the combination of a frame containing a chamber, division means movable into and out of the frame, means for actuating said division means, feeding means movable into the frame forwardly in the frame and then out of the same and also movable rearwardly outside the frame, means for actuating said feeding means, a plunger head movable into the frame, forwardly in said frame and out of the frame and also movable rearwardly outside the frame, means for actuating the said plunger head, and a tying-chamber in advance of the traverse of the plunger head and adapted to receive head blocks.

4. In a press, the combination of a frame containing a chamber, division means movable into and out of the frame, means for actuating said division means, feeding means movable into the frame forwardly in the frame and then out of the same and also movable rearwardly outside the frame, means for actuating said feeding means, a plunger head movable into the frame, forwardly in said frame and out of the frame and also movable rearwardly outside the frame, means for actuating the said plunger head, a tying chamber in advance of the traverse of the plunger heads and adapted to receive head blocks, and means for feeding hay forwardly in the chamber; said means being located in the frame in rear of the division means.

5. In a hay press, the combination of a frame containing a chamber, a plunger head, means for advancing the plunger head in said chamber, means for retracting the plunger head, and means for raising the plunger head during the retraction thereof and then permitting said head to drop in the chamber.

6. In a press, the combination of a frame having a chamber, a longitudinally and vertically movable plunger, means for advancing and retracting the plunger head, wheels on the plunger head, vertically-swinging inclined rails for raising the plunger-head; said rails having lower free ends adapted to permit the wheels to pass forwardly under the same, and rails for receiving and guiding the wheels of the plunger head when said wheels drop from the upper ends of the first-named rails.

7. In a press, the combination of a chamber, a plunger, means for actuating the plunger, feeding means, means actuable by the plunger-actuating means for moving the feeding means first forwardly and then rearwardly, means for moving the feeding means into the chamber, means for moving said feeding means out of the chamber, and means actuable by the feeding means for moving the division means inwardly and outwardly.

8. In a press, the combination of a frame having a chamber, a longitudinally and vertically movable plunger head having wheels, sprocket belts, means for supporting said belts, a pitman arranged between and connected with said belts and connecting the same with the plunger head, inclined vertically-swinging rails pivoted at their upper ends, and inclined rails arranged in rear of and under the upper portions of the first-named rails.

9. In a press, the combination of a frame having a chamber, a horizontally and vertically movable plunger head, sprocket belts, means for supporting said belts, a pitman arranged between and connected with said belts and connecting the same with the plunger head, and means for raising the plunger head on the rearward traverse thereof and for permitting the plunger head to move downwardly at the end of said traverse.

10. In a press, the combination of a frame having a chamber, a movable plunger, means for actuating the plunger, a movable dividing fork, and a movable feeding fork; said forks being actuable by said plunger-actuating means.

11. In a press, the combination of a frame having a chamber, a feeding fork movable into and out of the chamber and also movable in the chamber and outside the chamber, a feeding-fork conveyer, a shaft, means for rotating said shaft, a connection between the conveyer and the shaft for moving the latter by the former, means for rotating the shaft, means for reversing the direction of rotation of the shaft, and means for inserting and retracting the feeding fork.

12. In a press, the combination of a main frame, a plunger, means for actuating the same, feeding means, means for moving the feeding means first in one direction and then in the opposite direction; said means including a revoluble shaft, gears loose on said shaft, a clutch mounted to turn with and move endwise on the shaft and into and out of engagement with said gears, a gear intermeshed with the first-named gears, and connected with and actuable by the plunger-operating means, and step by step means actuable by the plunger-operating means for controlling the clutch.

13. In a press, the combination of a frame, division means movable into and out of the frame, feeding means movable forwardly and rearwardly and into and out of the frame, means for operating the feeding means, and means actuable by the feeding means for operating the division means.

14. In a press, the combination of a frame, a feeding-fork, a feeding-fork conveyer, means for moving said conveyer forwardly and rearwardly, a swinging-frame connected to the conveyer and carrying the fork, a trigger mounted on the frame and connected to the fork, and means on the frame for coöperating with said trigger to move the fork into and out of the main frame.

15. In a press, the combination of a frame, a feeding-fork, a feeding-fork conveyer, means for moving said conveyer forwardly and rearwardly, a swinging-frame connected to the conveyer and carrying the fork, a trigger mounted on the frame and connected to the fork, means on the frame for coöperating with said trigger to move the fork into and out of the main frame, a keeper for coöperating with the swinging frame and holding the fork in the frame, and means for controlling said keeper.

In testimony whereof I have hereunto set my hand in presence of two subscribing witnesses.

HARRY B. WING.

Witnesses:
SYLVESTER J. MILLER,
ASHTON WINSLOW.

Copies of this patent may be obtained for five cents each, by addressing the "Commissioner of Patents, Washington, D. C."